Sept. 30, 1924.
A. H. CALKINS
TIRE SHIELD
Filed May 8, 1923
1,509,859
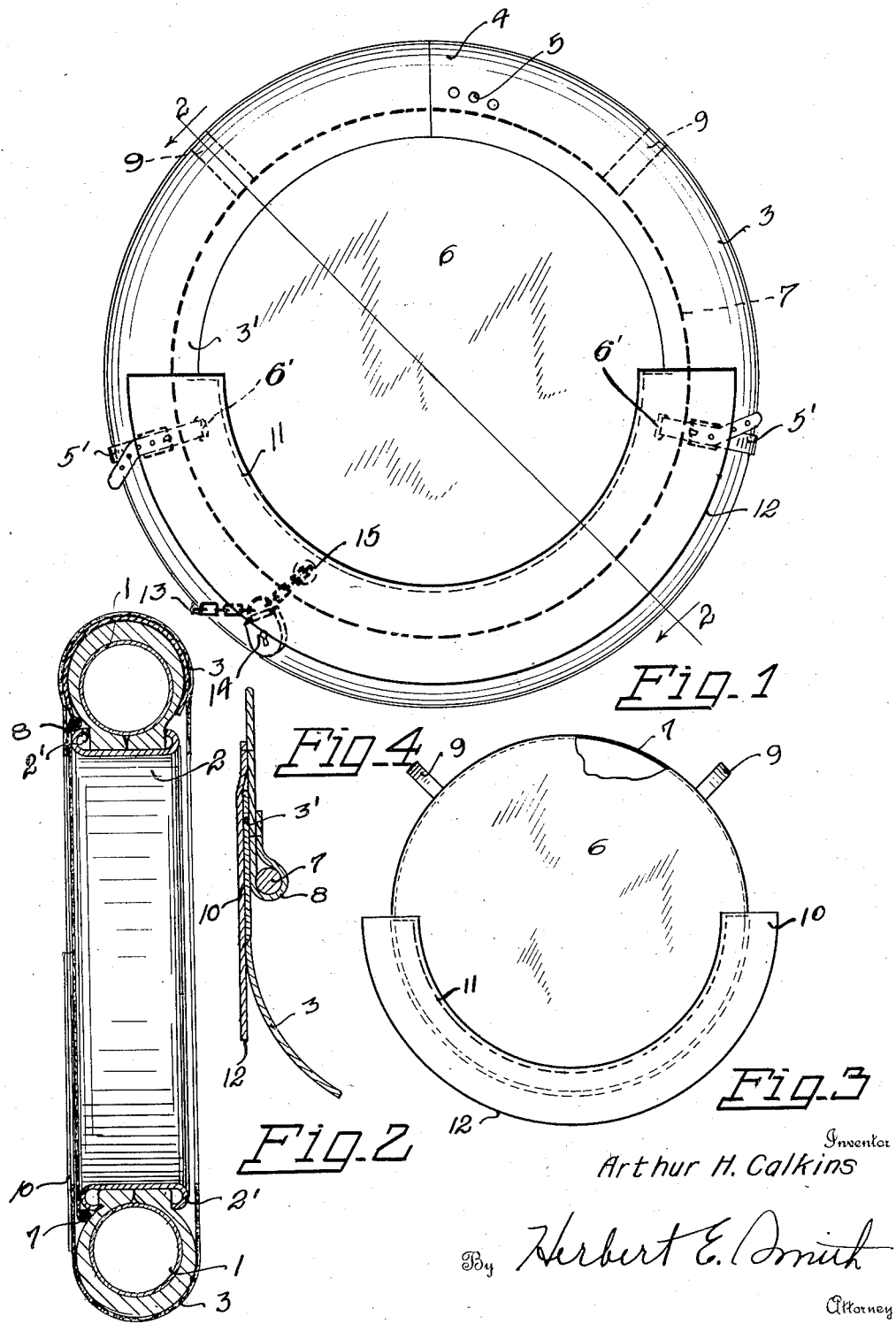
Inventor
Arthur H. Calkins
By Herbert E. Smith
Attorney Patented Sept. 30, 1924.

1,509,859

UNITED STATES PATENT OFFICE.

ARTHUR H. CALKINS, OF SPOKANE, WASHINGTON.

TIRE SHIELD.

Application filed May 8, 1923. Serial No. 637,435.

*To all whom it may concern:*

Be it known that I, ARTHUR H. CALKINS, a citizen of the United States, residing at Spokane, in Spokane County and State of Washington, have invented certain new and useful Improvements in Tire Shields, of which the following is a specification.

My present invention relates to improvements in tire shields for use in connection with spare tires generally carried by automobiles, as an accessory for emergency use. Such spare tires are usually equipped with annular, flexible covers of tubular shape, which encase the tires, but fail to insure an effective water-proof and dust-proof covering, in consequence of which the spare tire is caused to deteriorate before it can be used. By the utilization of the shield of my invention, in combination with the tire cover of this type, I provide means for preventing the ingress of rainwater to the tire or between the tire and tire cover, and also exclude dust and dirt, while at the same time enhancing the appearance of the spare tire when carried by the automobile.

To this end the invention contemplates the use of a shield for closing the space within the inner periphery of the rim of the spare tire, which shield may with facility be combined for use with the usual tubular tire-cover and be retained securely in its proper position. And in addition the shield is equipped with a flap, exterior of the tire and its cover for shedding water, dust and dirt from the tire.

The invention thus consists in certain novel combinations and arrangements of the tire shield in conjuction with the tire and its cover, as will hereinafter be more fully described and claimed.

In the accompanying drawings I have illustrated one complete example of the physical embodiment of my invention in combination with a tire and its cover, in which the parts are combined and arranged in accord with one mode I have devised for the practical application of the principles of my invention.

Figure 1 is a face view of a spare tire in vertical position as usually carried by an automobile, having a cover thereon, and equipped with the tire shield of my invention.

Figure 2 is a transverse sectional view at line 2—2 of Figure 1.

Figure 3 is a face view of the tire shield, at its outer side, detached.

Figure 4 is an enlarged sectional view at one edge of the tire shield, showing the flap and its relation to an illustrated portion of the tire cover.

In order that my invention may readily be understood and its merits be made apparent I have shown a standard form of pneumatic tire 1 with its metallic rim 2, over which the tire cover 3 has been stretched. This tire cover is of well known type and made up of canvas or other flexible material in tubular form to conform to the exterior of the tire 1, with its inner edges 3' extending around the tire adjacent to the flanges 2' of the metal rim. By this arrangement of parts, as will be seen in Figure 2 an opening is left between the edges 3' of the tire cover and the rim flanges 2', through which dust, dirt and water may penetrate, particularly at the outer side of the tire when the latter is carried by the automobile. In the form shown in Figure 1 the cover has overlapping ends at 4, which may be secured by suitable fastenings indicated at 5, and two or more straps 5' may be utilized for securing the spare tire to its rack (not shown) but carried by the automobile.

The shield of my invention for use with the tire cover is provided to close the open space within the tire rim, at either one or both sides of the tire, and said shield is made up or a circular disk 6 of leather, fabric, or other suitable material, and provided with eyelets 6', shown in dotted lines, through which the straps 5' pass for securing the shield in place.

The disk or web 6 at its edge is provided with a reinforcing metal ring 7, which, if desired may be made of resilient and elastic wire of proper strength, and made in various sizes, a little larger in diameter than and adapted to conform to the rim flanges 2'. The ring is enclosed in an annular casing 8 that is formed by bending or folding over the edge of the web, and the folded edge may be secured to the web as by stitching or in other suitable manner.

As seen in Figure 2 the encased ring is slipped over the flange of the tire rim, and by means of two suspending hooks 9, 9 the shield is secured to the tire. These hooks, it will be observed are curved to conform to the exterior of the tire, and may be made of resilient metal to facilitate their attachment to the tire. The suspending hooks are positioned within the tire cover and directly on the tire itself, and as indicated in dotted lines in Figure 1 they are both located in position in order that they are spaced equidistant from the top center of the tire. The hooks are preferably attached to the metal ring to insure a durable and strong joint, and may be secured thereto in suitable manner.

From this description it will be obvious that the reinforced circular edge of the web 6 is retained in position under the free edge 3' of the tire cover to effectually close the space within the tire rim. As an additional protection, the lower half of the tire is shielded by the presence of a flap 10 in the form of a curved strip of flexible material of the required width and of a length to extend approximately half around the tire.

At its inner edge, this curved strip is secured, as by stitches 11 to the web 6 on a line spaced from the reinforced edge of the web, leaving the major portion of the width of the strip and its edge 12 free to be slipped over and to encase the edge 3' of the tire cover around the lower half of said cover, as seen in Figure 4.

The strip or flap is thus adapted to encase the edge of the tire cover and overhang said cover throughout a desired portion thereof for the purpose of effectually preventing ingress of dust, dirt, or water and for shedding rainwater that may fall upon the web and drip toward the ground.

For locking the tire, cover and shield to the tire rack, a chain 13 and padlock 14 may be utilized, the chain being passed around the tire cover and through an eyelet 15 in the shield for securing the parts together.

Changes and alterations may be made and are contemplated in the adaptation of the device of my invention in actual use, and such changes come within the scope of my claims.

Having thus fully described my invention, what I claim as new and desire to secure by Letters Patent is:

1. A tire shield comprising a web conforming to the shape of the tire and provided with an edge ring to fit over the rim of a tire, means for suspending the web on a tire, and a curved strip having its inner edge attached to the web near its periphery leaving the major portion of said strip free.

2. A tire shield comprising a circular web, means at the edge of said web for engagement with a tire rim, and a flap fashioned of a curved strip secured at its inner edge to said web adapted to overhang a tire and its cover.

3. A tire shield comprising a circular web, an annular casing on said web, a metal reinforcing ring within said casing, suspending hooks connected to said ring, and a flap fashioned of a circular strip having its inner edge secured to the web.

In testimony whereof I affix my signature.

ARTHUR H. CALKINS.